United States Patent
Shi et al.

(10) Patent No.: US 11,133,968 B2
(45) Date of Patent: Sep. 28, 2021

(54) METHOD FOR DETERMINING SIZE OF DEMODULATION REFERENCE SIGNAL INDICATION INFORMATION, DEVICE AND STORAGE MEDIUM

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/739,689

(22) Filed: Jan. 10, 2020

(65) Prior Publication Data

US 2020/0153670 A1 May 14, 2020

Related U.S. Application Data

(63) Continuation of application No. PCT/CN2018/092506, filed on Jun. 22, 2018.

(51) Int. Cl.
*H04L 27/26* (2006.01)
*H04L 5/00* (2006.01)
(Continued)

(52) U.S. Cl.
CPC ........ *H04L 27/2613* (2013.01); *H04L 5/0051* (2013.01); *H04L 5/10* (2013.01); *H04W 72/042* (2013.01); *H04W 72/0446* (2013.01)

(58) Field of Classification Search
CPC ............ H04W 72/042; H04W 72/0446; H04L 5/0053; H04L 5/0051; H04L 5/10; H04L 27/2613
See application file for complete search history.

(56) References Cited

U.S. PATENT DOCUMENTS 6,725,441 B1  4/2004  Keller et al.
9,009,775 B2* 4/2015  Ko ........................ H04L 5/0044
                                                725/146
(Continued)

FOREIGN PATENT DOCUMENTS

CN  102036405 A  4/2011
CN  102761098 A  11/2012
(Continued)

OTHER PUBLICATIONS

MediaTek Inc, 3GPP TSG-RAN WG1 Meeting #92 R1-1801669, Remaining issues on DMRS, Athens, Greece, Feb. 26-Mar. 2, 2018.
Samsung; 3GPP TSG RAN WG1 Meeting #92bis R1-1804377; Corrections on DL/UL Resource Allocation,Sanya, China, Apr. 16-20, 2018.
International Search Report (ISR) with an English translation dated Feb. 22, 2019 for Application No. PCT/CN2018/092506.
(Continued)

*Primary Examiner* — Wei Zhao
(74) *Attorney, Agent, or Firm* — Ladas & Parry LLP

(57) ABSTRACT

A method for determining a size of demodulation reference signal indication information, including: determining, by a terminal device, a size of demodulation reference signal DMRS port indication information based on configuration information or protocol agreement; the DMRS port indication information is used for indicating port information of a DMRS; the configuration information includes: a time domain resource configuration information set and/or DMRS configuration information. Another method for determining a size of demodulation reference signal indication information, a network device, a terminal device and a storage medium are also disclosed.

17 Claims, 3 Drawing Sheets

A terminal device determines the size of DMRS port indication information based on configuration information or protocol agreement  /S101

(51) Int. Cl.
  *H04L 5/10* (2006.01)
  *H04W 72/04* (2009.01)

(56) References Cited

U.S. PATENT DOCUMENTS

| | | | |
|---|---|---|---|
| 2004/0059957 | A1 | 3/2004 | Menasce et al. |
| 2011/0097090 | A1* | 4/2011 | Cao .................. H04Q 11/0066 398/154 |
| 2020/0177358 | A1* | 6/2020 | Liu ....................... H04W 76/27 |

FOREIGN PATENT DOCUMENTS

| | | | |
|---|---|---|---|
| CN | 103037511 | A | 4/2013 |
| CN | 103945447 | A | 7/2014 |
| CN | 104685813 | A | 6/2015 |
| CN | 106470495 | A | 3/2017 |
| CN | 106559194 | A | 4/2017 |
| EP | 3340515 | A1 | 6/2018 |
| WO | 2017028750 | A1 | 2/2017 |

OTHER PUBLICATIONS

3GPP TSG RAN WG1 Meeting, R1-1807729, Summary of Bandwidth Part Remaining Issues, published on Apr. 20, 2018.
The First Office Action of correspondthg Chinese application No. 201880002987.7, dated Dec. 23, 2019.
The EESR of corresponding European application No. 18923081.8, dated Jul. 8, 2020.
Samsung:"Remaining details on DMRS", 3GPP Draft; R1-1717630, 3rd Generation Partnership Project (3GPP), Mobile Competence Centre; 650, Route Des Lucioles: F-06921 Sophia-Antipolis Cedex; France, vol. RAN WG1, No. Prague, CZ; Oct. 9, 2017-Oct. 13, 2017 Oct. 8, 2017(Oct. 8, 2017); XP051340816.
CMCC:"Discussion on DCI format design", 3GPP Draft; R1-1800546, 3rd Generation Partnership Project (3GPP), Mobile Competence Centre; 650, Route Des Lucioles: F-06921 Sophia-Antipolis Cedex; France, vol. RAN WG1, No. Vancouver; Canada; Jan. 22, 2018-Jan. 26, 2018 Jan. 13, 2018(Jan. 13, 20178), XP051384920.
The Notice of Allowance of corresponding Chinese application No. 201880002987.7, dated Apr. 30, 2020.

* cited by examiner

METHOD FOR DETERMINING SIZE OF DEMODULATION REFERENCE SIGNAL INDICATION INFORMATION, DEVICE AND STORAGE MEDIUM

CROSS-REFERENCE TO RELATED APPLICATIONS

This application is a continuation of International Application No. PCT/CN2018/092506, filed on Jun. 22, 2018, the disclosure of which is hereby incorporated by reference in its entirety.

TECHNICAL FIELD

The present disclosure relates to the field of wireless communication technologies, and in particular relates to a method for determining a size of demodulation reference signal indication information, a device and a storage medium.

BACKGROUND

In the 5th Generation (5G) New Radio (NR) system, there may be different Demodulation Reference Signal (DMRS) configuration for the Physical Downlink Shared Channel (PDSCH). Different DMRS configuration may result in uncertain size of Downlink Control Information (DCI), and a terminal device needs to perform blind detection according to possible sizes of the DCI. In this way, the complexity of operations of the terminal device and the network overhead are increased. Similarly, the above problem also exists for the Physical Uplink Shared Channel (PUSCH) and its corresponding DCI.

SUMMARY

To solve the above technical problems, embodiments of the present disclosure provide a method for determining a size of demodulation reference signal indication information, a device, and a storage medium, which can determine the size of DMRS port indication information based on configuration information or protocol agreement, thereby decreasing the number of blind detections and the network overhead, and reducing the complexity of operations of a terminal device.

In a first aspect, an embodiment of the present disclosure provides a method for determining a size of demodulation reference signal indication information, including:

determining, by a terminal device, a size of DMRS port indication information according to configuration information or protocol agreement; the DMRS port indication information is used for indicating port information of a DMRS;

the configuration information includes: a time domain resource configuration information set and/or DMRS configuration information.

In a second aspect, an embodiment of the present disclosure provides a method for determining a size of demodulation reference signal indication information, including:

sending, by a network device, configuration information; where the configuration information includes: a time domain resource configuration information set and/or DMRS configuration information, and the configuration information is used by the terminal device for determining a size of DMRS port indication information; the DMRS port indication information is used for indicating port information of a DMRS.

In a third aspect, an embodiment of the present disclosure provides a terminal device, where the terminal device includes:

a determining unit, configured to determine a size of DMRS port indication information based on configuration information or protocol agreement; the DMRS port indication information is used for indicating port information of a DMRS; the configuration information includes: a time domain resource configuration information set and/or DMRS configuration information.

In a fourth aspect, an embodiment of the present disclosure provides a network device, including: a sending unit, configured to send configuration information; where the configuration information includes: a time domain resource configuration information set and/or DMRS configuration information, and the configuration information is used by the terminal device for determining a size of DMRS port indication information; the DMRS port indication information is used for indicating port information of a DMRS.

In a fifth aspect, an embodiment of the present disclosure provides a terminal device, including a processor and a memory for storing a computer program that is capable of running on the processor, where, the processor is configured to perform steps of the above method for determining the size of the demodulation reference indication information, which is executable by a terminal device, when running the computer program.

In a sixth aspect, an embodiment of the present disclosure provides a network device, including a processor and a memory for storing a computer program that is capable of running on the processor, where, the processor is configured to perform steps of the above method for determining the size of the demodulation reference indication information, which is executable by a network device, when running the computer program.

In a seventh aspect, an embodiment of the present disclosure provides a storage medium, having an executable program stored thereon, where when the executable program is executed by a processor, the above method for determining the size of the demodulation reference indication information is implemented.

In the embodiments of the present disclosure, the terminal device can determine the size of the DMRS port indication information through the configuration information sent by the network device or according to the protocol agreement, and can further determine the size of DCI, thereby decreasing the number of blind detections and the network overhead, and reducing the complexity of operations of the terminal device.

DETAILED DESCRIPTION OF THE EMBODIMENTS

In order to have a more detailed understanding of the features and technical contents of embodiments of the present disclosure, the implementations of the embodiments of the present disclosure are described in detail below with reference to the accompanying drawings, which are only for reference and illustration and are not intended to limit the embodiments of the present disclosure.

Before illustrating the embodiments of the present disclosure, firstly, DMRS configuration of an NR system and indication of time domain resource allocation by the NR system are briefly described.

In the NR system, for a DMRS of a PDSCH, different DMRS configuration may exist based on the type and the max Length. and the number of bits required for indicating DMRS port indication information of different DMRS configuration is also different. The max Length here can be the maximum number of symbols occupied by a front-loaded DMRS. Different DMRS configuration may be indicated with different numbers of bits in DCI. For example, for DMRS type1, when the max Length=1, 4 bits are required in the DCI for indicating port information of a DMRS; for DMRS type1, when the max Length=2, 5 bits are required in the DCI for indicating the port information of the DMRS; for DMRS type2, when the max Length=1, 5 bits are required in the DCI for indicating the port information of the DMRS; for DMRS type2, when the max Length=2, 6 bits are required in the DCI for indicating the port information of the DMRS.

For the PDSCH, the NR system performs indication of the allocation of a time domain resource set using a 2-layer structure:

the first layer structure is that an RRC parameter PDSCH-Time Domain Allocation List configures a time domain resource configuration information set, and each element in the set includes two parameters: a PDSCH mapping type and an occupied symbol information;

the second layer structure is that DCI indicates which element in the time domain resource configuration information set is used.

It can be known based on the above second layer structure that, the DCI can dynamically select an element in the time domain resource configuration information set, and the DMRS configuration corresponding to different PDSCH mapping types may be different, which results in the number of bits of the port information indicating the DMRS in the DCI may also be different. Since the elements in the time domain resource configuration information set and the corresponding DMRS information indication are all in the same DCI, the terminal device cannot determine the size of the DMRS port indication information for indicating the port information of the DMRS in the DCI before the DCI can be demodulated.

For a PUSCH, the NR system is also similarly designed. Therefore, the subsequent embodiments are also applicable to the PUSCH and the corresponding DMRS port indication information.

Figure 1:
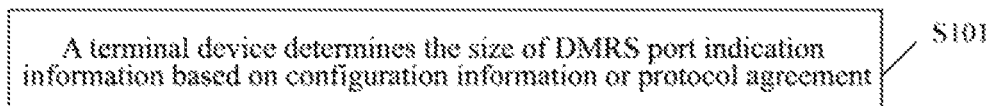
FIG. 1 is a schematic diagram of a first processing flow of a method for determining a size of demodulation reference signal indication information applied to a terminal device according to an embodiment of the present disclosure.

As shown in FIG. 1, a first processing flow of a method for determining a size of demodulation reference signal indication information applied to a terminal device according to an embodiment of the present disclosure includes the following steps:

step S101: a terminal device determines the size of DMRS port indication information based on configuration information or protocol agreement.

In the embodiment of the present disclosure, the terminal device determines the size of the DMRS port indication information based on the configuration information, or the terminal device determines the size of the DMRS port indication information based on the protocol agreement.

The configuration information includes: a time domain resource configuration information set and/or DMRS configuration information. The time domain resource configuration information set is configured by a network device to the terminal device through an RRC parameter, and the network device indicates, through DCI, which time domain resource configuration information in the time domain resource configuration information set is used for scheduling the PDSCH.

Embodiment 1

The terminal device receives the time domain resource configuration information set sent by the network device, and determines the maximum value of the number of bits, which corresponds to DMRS configuration information for the time domain resource configuration information set and is required for indicating DMRS port information, to be the size of the DMRS port indication information.

For example, the time domain resource configuration information set includes five elements, and the numbers of bits, which correspond to DMRS configuration information for the five elements and are required for indicating the DMRS port information, are 4, 4, 4, 6, 6, respectively, then the terminal device determines that the size of the DMRS port indication information is 6 bits; that is, 6 bits are used as a domain in the DCI to indicate the port information of the DMRS.

In some embodiments, when the number of bits, which corresponds to DMRS configuration information for a certain element in the time domain resource configuration information set and is required for indicating DMRS port information, is 4 bits, 2 bits in the domain are reserved and not used; in an embodiment, the values of the 2 bits that are reserved and not used can be set to 0, 1, or other values, or can be set by the network device itself.

In other embodiments, when the number of bits, which corresponds to DMRS configuration information for a certain element in the time domain resource configuration information set and is required for indicating DMRS port information, is 4 bits, the number of bits used by the domain is the 4 bits that are currently required for indicating DMRS port information, and 2 bits are filled in other domain of the DCI; in an embodiment, the 2 bits filled in other domain of the DCI are set to 0.

Embodiment 2

The terminal device receives the DMRS configuration information sent by the network device, and when the DMRS configuration information includes at least two kinds of DMRS configuration, the terminal device determines the maximum value of the number of bits, which correspond to the at least two kinds of DMRS configuration and are required for indicating DMRS port information, to be the size of the DMRS port indication information.

For example, the DMRS configuration information includes two kinds of DMRS configuration, and the corresponding numbers of bits required for indicating DMRS port information are 4 and 5, respectively, and the terminal device determines that the size of the DMRS port indication information is 5 bits; that is, 5 bits are used as a domain in the DCI to indicate the port information of the DMRS.

In some embodiments, when the number of bits, which corresponds to DMRS configuration information for a certain element in the time domain resource configuration information set and is required for indicating DMRS port information, is 4 bits, 1 bit in the domain is reserved and not used; in an embodiment, the value of the 1 bits that is reserved and not used can be set to 0, 1, or other values, or can be set by the network device itself.

In other embodiments, when the number of bits, which corresponds to DMRS configuration information for a certain element in the time domain resource configuration information set and is required for indicating DMRS port information, is 4 bits, the number of bits used by the domain is the 4 bits that are currently required for indicating DMRS port information, and 1 bit is filled in other domain of the DCI; in an embodiment, the 1 bit filled in other domain of the DCI is set to 0.

Embodiment 3

An implementation of the terminal device determining the size of the DMRS port indication information based on the protocol agreement is to determine the number of bits, which is stipulated by a protocol and is required for indicating DMRS port information, to be the size of the DMRS port indication information. In an embodiment, the number of bits which is stipulated by the protocol and is required for the DMRS port information is 6 bits.

In some embodiments, when the number of bits, which corresponds to DMRS configuration information for a certain element in the time domain resource configuration information set and is required for indicating DMRS port information, is 4 bits, 2 bits in the domain are reserved and not used; in an embodiment, the values of the 2 bits that are reserved and not used can be set to 0, 1, or other values, or can be set by the network device itself.

In other embodiments, when the number of bits, which corresponds to DMRS configuration information for a certain element in the time domain resource configuration information set and is required for indicating DMRS port information, is 4 bits, the number of bits used by the domain is the 4 bits that are currently required for indicating DMRS port information, and 2 bits are filled in other domain of the DCI; in an embodiment, the 2 bits filled in other domain of the DCI are set to 0.

Figure 2:
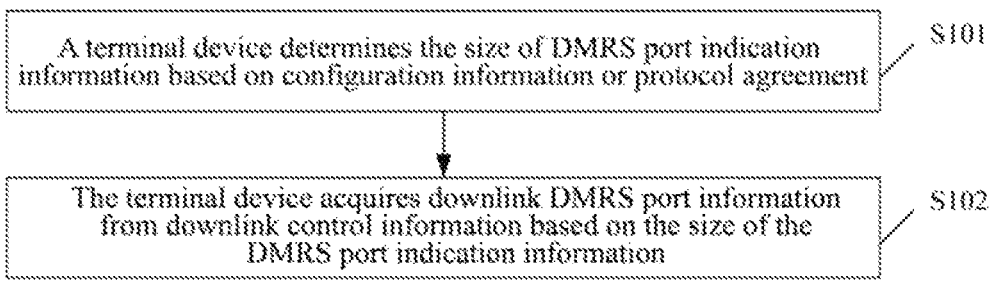
FIG. 2 is a schematic diagram of a second processing flow of a method for determining a size of demodulation reference signal indication information applied to a terminal device according to an embodiment of the present disclosure.

As shown in FIG. 2, a second processing flow of a method for determining a size of demodulation reference signal indication information applied to a terminal device according to an embodiment of the present disclosure is similar to the above first processing flow, and the difference lies in further including:

step S102: the terminal device acquires downlink DMRS port information from downlink control information based on the size of the DMRS port indication information.

Figure 3:
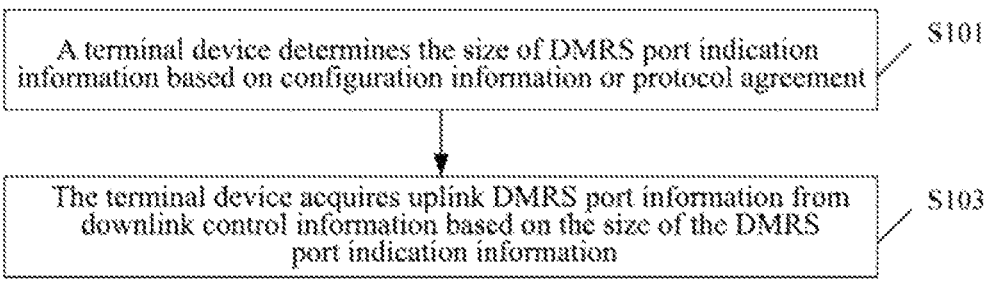
FIG. 3 is a schematic diagram of a third processing flow of a method for determining a size of demodulation reference signal indication information applied to a terminal device according to an embodiment of the present disclosure.

As shown in FIG. 3, a third processing flow of a method for determining a size of demodulation reference signal indication information applied to a terminal device according to an embodiment of the present disclosure is similar to the above first processing flow, and the difference lies in further including:

step S103: the terminal device acquires uplink DMRS port information from downlink control information based on the size of the DMRS port indication information.

It should be noted that the configuration information involved in the above embodiments of the present disclosure corresponds to the physical downlink shared channel; or the configuration information corresponds to the physical uplink shared channel; or the configuration information corresponds to the physical downlink shared channel and the physical uplink shared channel. When the configuration information corresponds to the physical downlink shared channel and the physical uplink shared channel, the numbers of bits used for the domains indicating the port information of the DMRSs in the physical downlink shared channel and the physical uplink shared channel are the same.

Figure 4:
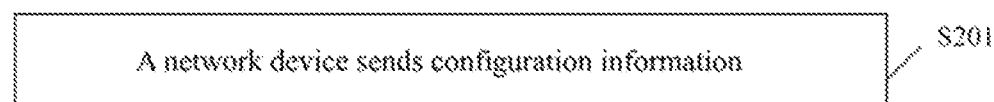
FIG. 4 is a schematic diagram of a processing flow of a method for determining a size of demodulation reference signal indication information applied to a network device according to an embodiment of the present disclosure.

As shown in FIG. 4, a processing flow of a method for determining a size of demodulation reference signal indication information applied to a network device according to an embodiment of the present disclosure includes the following steps:

step S201: a network device sends configuration information.

In the embodiment of the present disclosure, the configuration information corresponds to the physical downlink shared channel; or the configuration information corresponds to the physical uplink shared channel: or the configuration information corresponds to the physical downlink shared channel and the physical uplink shared channel. The configuration information includes: a time domain resource configuration information set and/or DMRS configuration information, and the configuration information is used by a terminal device to determine the size of DMRS port indication information; and the DMRS port indication information is used for indicating port information of a DMRS.

In some embodiments, the network device sends the time domain resource configuration information set to the terminal device, where the number of bits which corresponds to DMRS configuration information for each time domain resource configuration in the time domain resource configuration information set and is required for indicating DMRS port information is the same.

In other embodiments, the network device sends the time domain resource configuration information set to the terminal device, where DMRS configuration corresponding to each time domain resource configuration in the time domain resource configuration information set is the same.

The network device sends the DMRS configuration information to the terminal device, where when the DMRS configuration information includes at least two kinds of DMRS configuration, the numbers of bits which correspond to the at least two kinds of DMRS configuration and are required for indicating DMRS port information are the same.

The network device sends only one kind of DMRS configuration to the terminal device.

In the embodiment of the present disclosure, when a first bit number is actually required for the DMRS port indication information, the size of the DMRS port indication information determined by the terminal device is a second bit number, and the first bit number is smaller than the second bit number, then the size of an indication domain of the DMRS is the second bit number, and one or more bits, the number of which corresponds to a difference value between the second bit number and the first bit number, are reserved in the indication domain of the DMRS.

When the first bit number is actually required for the DMRS port indication information, the size of the DMRS port indication information determined by the terminal device is the second bit number, and the first bit number is smaller than the second bit number, then the size of the indication domain of the DMRS is the first bit number, and one or more bits, the number of which corresponds to a difference value between the second bit number and the first bit number, are filled in a domain in downlink control information other than the indication domain of the DMRS.

Embodiment 4

The network device configures the time domain resource configuration information set for the terminal device though an RRC parameter, and the number of bits which corresponds to DMRS configuration information for each time domain resource configuration in the time domain resource configuration information set and is required for indicating DMRS port information is the same.

Embodiment 5

The network device configures the time domain resource configuration information set for the terminal device though an RRC parameter, and the DMRS configuration corresponding to each element in the time domain resource configuration information set is the same; for the same DMRS configuration, the corresponding number of bits required for indicating DMRS port information is also the same.

Embodiment 6

The network device configures a group of time domain resource configuration information sets for the terminal device, and the network device indicates through DCI that an element in the time domain resource configuration information sets is used for the corresponding scheduled PDSCH.

In some embodiments, if the time domain resource configuration information in the time domain resource configuration information set includes only one PDSCH mapping manner: a mapping Type A, then X bits are used in the DCI to indicate DMRS port information; where X is determined according to the DMRS configuration.

In other embodiments, if the time domain resource configuration information in the time domain resource configuration information set includes only one PDSCH mapping manner: a mapping Type B, then Y bits are used in the DCI to indicate DMRS port information, where Y is determined according to the DMRS configuration.

In some other embodiments, if the time domain resource configuration information in the time domain resource configuration information set includes two PDSCH mapping manners: the mapping Type A and the mapping Type B, X bits are required for indicating the DMRS configuration corresponding to the PDSCH mapping Type A, and Y bits are required for indicating the DMRS configuration corresponding to the PDSCH mapping Type B, at this time, Z is the maximum value in X and Y, then Z is the number of bits required for the DCI to indicate the DMRS information port, and Z bits are used as a domain in the DCI for indicating the port information of the DMRS.

Taking five elements being included in the time domain resource configuration information set as an example, when only X valid bits are actually required for an element with the mapping type being PDSCH mapping Type A to indicate DMRS port information, (Z-X) bits in the domain can be reserved and not used; when only Y valid bits are actually required for an element with the mapping type being PDSCH mapping Type B to indicate DMRS port information, (Z-Y) bits in the domain can be reserved and not used.

Taking five elements being included in the time domain resource configuration information set as an example, when only X valid bits are actually required for an element with the mapping type being PDSCH mapping Type A to indicate DMRS port information, the number of bits used in the domain is the X bits currently required for indicating DMRS port information, and (Z-X) bits are filled in other domain of the DCI; when only Y valid bits are actually required for an element with the mapping type being PDSCH mapping Type B to indicate DMRS port information, the number of bits used in the domain is the Y bits currently required for indicating DMRS port information, and (Z-Y) bits are filled in other domain of the DCI.

Figure 5:
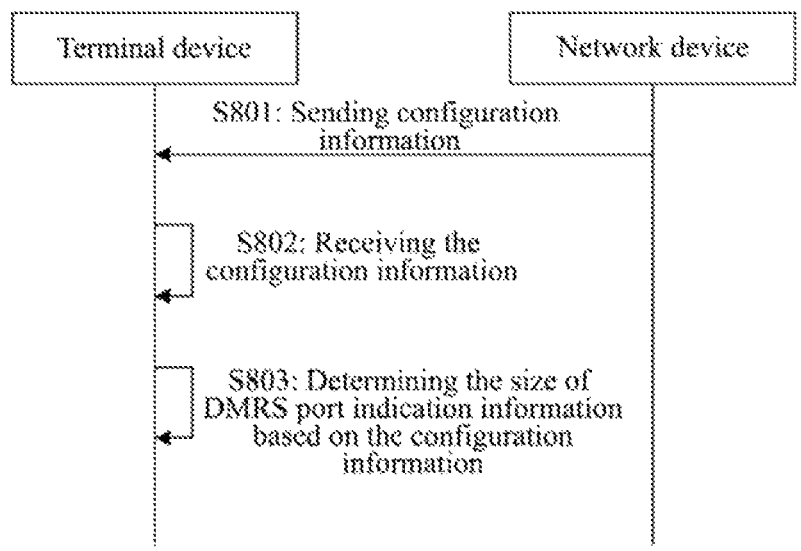
FIG. 5 is a schematic diagram of a processing flow of a method for determining a size of demodulation reference signal indication information applied to a communication system according to an embodiment of the present disclosure.

As shown in FIG. 5, an embodiment of the present disclosure further provides a method for determining a size of demodulation reference signal indication information applied to a communication system, including the following steps:

step S801, a network device sends configuration information to a terminal device.

In the embodiment of the present disclosure, the configuration information corresponds to the physical downlink shared channel; or the configuration information corresponds to the physical uplink shared channel: or the configuration information corresponds to the physical downlink shared channel and the physical uplink shared channel. The configuration information includes: a time domain resource configuration information set and/or DMRS configuration information, and the configuration information is used by the terminal device to determine the size of DMRS port indication information; and the DMRS port indication information is used for indicating port information of a DMRS.

Step S802, the terminal device receives the configuration information.

Step S803, the terminal device determines the size of the DMRS port indication information based on the configuration information.

In some embodiments, the terminal device determines the maximum value of the number of bits, which corresponds to DMRS configuration information for the time domain resource configuration information set and is required for indicating DMRS port information, to be the size of the DMRS port indication information.

In other embodiments, when the DMRS configuration information includes at least two kinds of DMRS configuration, the terminal device determines the maximum value of the number of bits, which corresponds to the at least two kinds of DMRS configuration and is required for indicating DMRS port information, to be the size of the DMRS port indication information.

Figure 6:
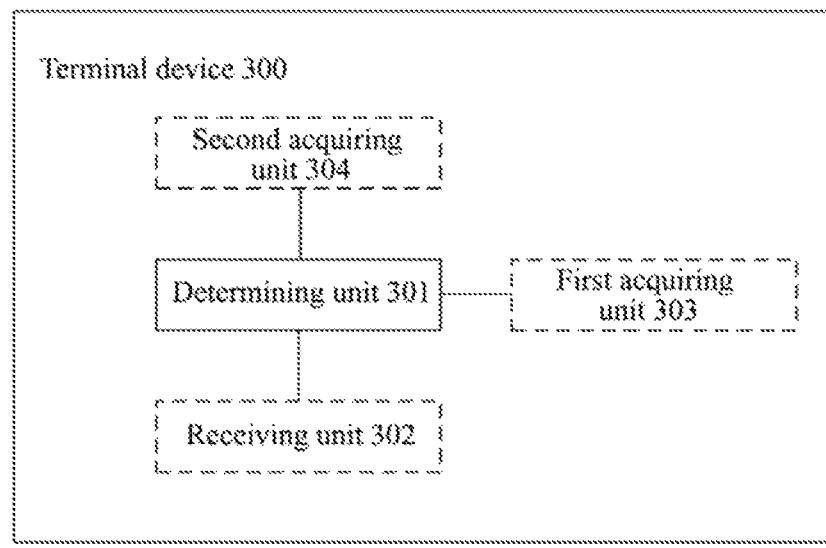
FIG. 6 is a schematic structural diagram of a terminal device according to an embodiment of the present disclosure.

Based on the above method for determining the size of the demodulation reference signal indication information, an embodiment of the present disclosure further provides a terminal device 300. As shown in FIG. 6, the constituent structure of the terminal device 300 includes:

a determining unit 301, configured to determine the size of DMRS port indication information based on configuration information or protocol agreement; the DMRS port indication information is used for indicating port information of a DMRS;

the configuration information includes: a time domain resource configuration information set and/or DMRS configuration information.

In an embodiment, the terminal device 300 further includes:

a receiving unit 302, configured to receive configuration information sent by a network device.

In an embodiment, the determining unit 301 is configured to determine the maximum value of the number of bits, which corresponds to DMRS configuration information for the time domain resource configuration information set and is required for indicating DMRS port information, to be the size of the DMRS port indication information.

In an embodiment, the determining unit 301 is configured to: when the DMRS configuration information includes at least two kinds of DMRS configuration, determine the maximum value of the number of bits, which corresponds to the at least two kinds of DMRS configuration and is required for indicating DMRS port information, to be the size of the DMRS port indication information.

In an embodiment, the determining unit 301 is configured to determine the number of bits, which is stipulated by a protocol and is required for indicating DMRS port information, to be the size of the DMRS port indication information.

In an embodiment, the number of bits which is stipulated by the protocol and is required for the DMRS port information is 6 bits.

In an embodiment, the number of bits which corresponds to DMRS configuration information for each time domain resource configuration in the time domain resource configuration information set and is required for indicating DMRS port information is the same.

In an embodiment, when a first bit number is actually required for the DMRS port indication information, the size of the DMRS port indication information determined by the terminal device is a second bit number, and the first bit number is smaller than the second bit number, then the size of an indication domain of the DMRS is the second bit number, and one or more bits, the number of which corresponds to a difference value between the second bit number and the first bit number, are reserved in the indication domain of the DMRS.

In an embodiment, when the first bit number is actually required for the DMRS port indication information, the size of the DMRS port indication information determined by the terminal device is a second bit number, and the first bit number is smaller than the second bit number, then the size of the indication domain of the DMRS is the first bit number, and one or more bits, the number of which corresponds to a difference value between the second bit number and the first bit number, are filled in a domain in downlink control information other than the indication domain of the DMRS.

In an embodiment, the terminal device further includes: a first acquiring unit 303, configured to acquire uplink DMRS port information from the downlink control information based on the size of the DMRS port indication information.

In an embodiment, the terminal device further includes: a second acquiring unit 304, configured to acquire downlink DMRS port information from the downlink control information based on the size of the DMRS port indication information.

In an embodiment, the configuration information corresponds to the physical downlink shared channel; or the configuration information corresponds to the physical uplink shared channel; or the configuration information corresponds to the physical downlink shared channel and the physical uplink shared channel.

Figure 7:
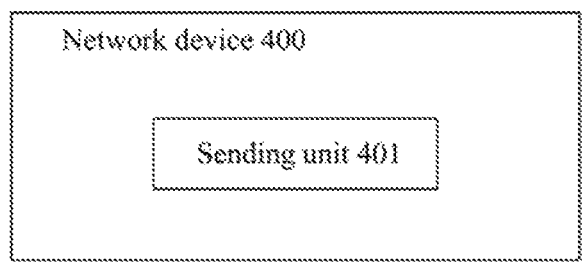
FIG. 7 is a schematic structural diagram of a network device according to an embodiment of the present disclosure.

Based on the above method for determining the size of the demodulation reference signal indication information, an embodiment of the present disclosure further provides a network device 400. As shown in FIG. 7, the constituent structure of the network device 400 includes:

a sending unit 401, configured to send configuration information; the configuration information includes: a time domain resource configuration information set and/or DMRS configuration information, and the configuration information is used by a terminal device to determine the size of DMRS port indication information; and the DMRS port indication information is used for indicating port information of a DMRS.

In an embodiment, the sending unit 401 is configured to send the time domain resource configuration information set to the terminal device, where the number of bits which corresponds to DMRS configuration information for each time domain resource configuration in the time domain resource configuration information set and is required for indicating DMRS port information is the same.

In an embodiment, the sending unit 401 is configured to send the time domain resource configuration information set to the terminal device, where the DMRS configuration corresponding to each time domain resource configuration in the time domain resource configuration information set is the same.

In an embodiment, the sending unit 401 is configured to send the DMRS configuration information to the terminal device, where when the DMRS configuration information includes at least two kinds of DMRS configuration, the numbers of bits which correspond to the at least two kinds of DMRS configuration and are required for indicating DMRS port information are the same.

In an embodiment, the sending unit 401 is configured to send one kind of DMRS configuration to the terminal device.

In an embodiment, when a first bit number is actually required for the DMRS port indication information, the size of the DMRS port indication information determined by the terminal device is a second bit number, and the first bit number is smaller than the second bit number, then the size of an indication domain of the DMRS is the second bit number, and one or more bits, the number of which corresponds to a difference value between the second bit number and the first bit number, are reserved in the indication domain of the DMRS.

In an embodiment, when the first bit number is actually required for the DMRS port indication information, the size of the DMRS port indication information determined by the terminal device is the second bit number, and the first bit number is smaller than the second bit number, then the size of the indication domain of the DMRS is the first bit number, and one or more bits, the number of which corresponds to a difference value between the second bit number and the first bit number, are filled in a domain in downlink control information other than the indication domain of the DMRS.

Figure 8:
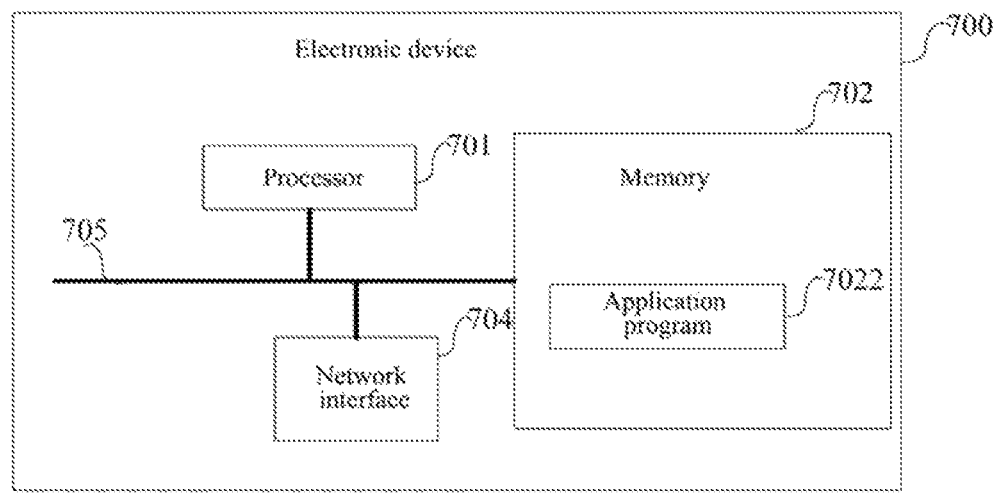
FIG. 8 is a schematic structural diagram of hardware of an electronic device according to an embodiment of the present disclosure.

FIG. 8 is a schematic structural diagram of hardware of an electronic device (a network device or a terminal device) according to an embodiment of the present disclosure. The electronic device 700) includes: at least one processor 701, a memory 702, and at least one network interface 704. The components in the electronic device 700 are coupled together though a bus system 705. It can be understood that the bus system 705 is used to implement connection communication between these components. The bus system 705 includes a power bus, a control bus, and a state signal bus in addition to a data bus. But for clarity of description, various buses are labeled as the bus system 705 in FIG. 8.

It can be understood that the memory 702 can be either a volatile memory or a non-volatile memory, and can include both volatile and non-volatile memories. The non-volatile memory may be a ROM, a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, an optical disk, or a Compact Disc Read-Only Memory (CD-ROM); the magnetic surface memory may be a disk memory or a tape memory. The volatile memory may be a Random Access Memory (RAM), which is used as an external cache. Though exemplary but not limiting explanations, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), a Direct Rambus Random Access Memory (DRRAM). The memory 702 described in the embodiments of the present disclosure is intended to include, but is not limited to, these and any other suitable types of memories.

The memory 702 in the embodiments of the present disclosure is used to store various types of data to support operations of the electronic device 700. Examples of such data include: any computer program for being operated on the electronic device 700, such as an application program 7022. A program of implementing the method of the embodiments of the present disclosure can be included in the application program 7022.

The method disclosed in the above embodiments of the present disclosure can be applied to the processor 701 or implemented by the processor 701. The processor 701 may be an integrated circuit chip with signal processing capability. In the implementation process, each step of the above method may be completed by an integrated logic circuit of hardware in the processor 701 or instructions in a form of software. The processor 701 described above may be a general purpose processor, a Digital Signal Processor (DSP), or other programmable logic device, discrete gate or transistor logic device, discrete hardware component, or the like. The processor 701 can implement or perform the various methods, steps, and logic blocks disclosed in the embodiments of the present disclosure. The general purpose processor can be a microprocessor or any conventional processor or the like. The steps of the method disclosed in the embodiments of the present disclosure may be directly performed by a hardware decoding processor, or may be performed by a combination of hardware and software modules in the decoding processor. The software modules can be located in a storage medium which is located in the memory 702, and the processor 701 reads the information in the memory 702, and completes the steps of the foregoing method in combination with its hardware.

In an exemplary embodiment, the electronic device 700 may be implemented by one or more Application Specific Integrated Circuits (ASICs), DSPs, Programmable Logic Devices (PLDs). Complex Programmable Logic Devices (CPLDs). FPGAs, general purpose processors, controllers, MCUs, MPUs, or other electronic components for performing the foregoing method.

The present disclosure is described with reference to flow charts and/or block diagrams of methods, devices (systems), and computer program products according to embodiments of the present disclosure. It can be understood that each flow and/or block of the flow charts and/or block diagrams, and a combination of the flow and/or block in the flow charts and/or block diagrams can be realized by computer program instructions. These computer program instructions can be provided to the processor of a general purpose computer, a special purpose computer, an embedded processor, or other programmable data processing device to generate a machine, such that an apparatus for realizing the specified functions in one or more flows of the flow charts or in one or more blocks of the block diagrams is generated through instructions performed by a processor of a computer or other programmable data processing device.

These computer program instructions can also be stored in a computer readable memory that can guide a computer or other programmable data processing device to work in a specific manner, such that instructions stored in the computer readable memory generate a manufacture including an instruction apparatus, and the instruction apparatus realizes the specified functions in one or more flows of the flow charts or in one or more blocks of the block diagrams.

These computer program instructions can also be loaded onto a computer or other programmable data processing device, such that a series of operational steps are performed on the computer or other programmable device to generate computer-realized processing, thereby instructions performed on the computer or other programmable device provide steps for realizing the specified functions in one or more flows of the flow charts or in one or more blocks of the block diagrams.

The above is only the preferred embodiments of the present disclosure, but is not intended to limit the protection scope of the present disclosure. Any modifications, equivalent substitutions and improvements made within the spirit and principle of the present disclosure should be included in the protection scope of the present disclosure.

What is claimed is:

1. A method for determining a size of demodulation reference signal (DMRS) indication information, comprising:
   determining, by a terminal device, a size of demodulation reference signal port indication information based on configuration information or protocol agreement; the DMRS port indication information is used for indicating port information of a DMRS;
   the configuration information comprises at least one of: a time domain resource configuration information set and DMRS configuration information;

wherein the determining, by a terminal device, a size of DMRS port indication information based on configuration information comprises:

determining, by the terminal device, a maximum value of the number of bits, which corresponds to DMRS configuration information for the time domain resource configuration information set and is required for indicating DMRS port information, to be the size of the DMRS port indication information.

2. The method according to claim 1, wherein the method further comprises:

receiving, by the terminal device, the configuration information sent by a network device.

3. The method according to claim 1, wherein the determining, by a terminal device, a size of DMRS port indication information based on configuration information comprises:

when the DMRS configuration information comprises at least two kinds of DMRS configuration, determining, by the terminal device, a maximum value of the numbers of bits, which correspond to the at least two kinds of DMRS configuration and are required for indicating DMRS port information, to be the size of the DMRS port indication information.

4. The method according to claim 1, wherein determining, by a terminal device, a size of DMRS port indication information based on protocol agreement comprises:

determining, by the terminal device, the number of bits, which is stipulated by a protocol and is required for indicating DMRS port information, to be the size of the DMRS port indication information.

5. A terminal device, comprising a processor and a memory for storing a computer program, wherein, when running the computer program, the processor is configured to:

determine a size of the demodulation reference signal (DMRS) port indication information based on configuration information or protocol agreement, wherein the DMRS port indication information is used for indicating port information of a DMRS;

the configuration information comprises at least one of: a time domain resource configuration information set and DMRS configuration information;

wherein the processor is configured to:

determine a maximum value of the number of bits, which corresponds to DMRS configuration information for the time domain resource configuration information set and is required for indicating DMRS port information, to be the size of the DMRS port indication information.

6. The terminal device according to claim 5, wherein the processor is further configured to control a network interface to:

receive the configuration information sent by a network device.

7. The terminal device according to claim 5, wherein the processor is further configured to:

when the DMRS configuration information comprises at least two kinds of DMRS configuration, determine a maximum value of the numbers of bits, which correspond to the at least two kinds of DMRS configuration and are required for indicating DMRS port information, to be the size of the DMRS port indication information.

8. The terminal device according to claim 5, wherein the processor is further configured to:

determine the number of bits, which is stipulated by a protocol and is required for indicating DMRS port information, to be the size of the DMRS port indication information.

9. The terminal device according to claim 8, wherein the number of bits which is stipulated by the protocol and is required for the DMRS port information is 6 bits.

10. The terminal device according to claim 5, wherein the number of bits which corresponds to DMRS configuration information for each time domain resource configuration in the time domain resource configuration information set and is required for indicating DMRS port information is the same.

11. The terminal device according to claim 5, wherein when a first bit number is actually required for the DMRS port indication information, the size of the DMRS port indication information determined by the terminal device is a second bit number, and the first bit number is smaller than the second bit number, a size of an indication domain of the DMRS is the second bit number, and one or more bits, the number of which corresponds to a difference value between the second bit number and the first bit number, are reserved in the indication domain of the DMRS.

12. The terminal device according to claim 5, wherein when a first bit number is actually required for the DMRS port indication information, the size of the DMRS port indication information determined by the terminal device is a second bit number, and the first bit number is smaller than the second bit number, a size of an indication domain of the DMRS is the first bit number, and one or more bits, the number of which corresponds to a difference value between the second bit number and the first bit number, are filled in a domain in downlink control information other than the indication domain of the DMRS.

13. The terminal device according to claim 5, wherein the processor is further configured to:

acquire at least one of uplink DMRS port information and downlink DMRS port information from downlink control information based on the size of the DMRS port indication information.

14. The terminal device according to claim 5, wherein the configuration information corresponds to a physical downlink shared channel;

or the configuration information corresponds to a physical uplink shared channel;

or the configuration information corresponds to a physical downlink shared channel and a physical uplink shared channel.

15. A network device, comprising a processor and a memory for storing a computer program, wherein, when running the computer program, the processor is configured to control a network interface to:

send configuration information; wherein the configuration information comprises at least one of: a time domain resource configuration information set and demodulation reference signal (DMRS) configuration information, and the configuration information is used by a terminal device for determining a size of DMRS port indication information; the DMRS port indication information is used for indicating port information of a DMRS;

wherein the processor is further configured to control a network interface to:

send the time domain resource configuration information set to the terminal device, wherein the number of bits which corresponds to DMRS configuration information for each time domain resource configuration in the time domain resource configuration information set and is required for indicating DMRS port information is the same.

16. The network device according to claim 15, wherein the processor is further configured to control a network interface to:

send the time domain resource configuration information set to the terminal device, wherein DMRS configuration corresponding to each time domain resource configuration in the time domain resource configuration information set is the same.

17. The network device according to claim 15, wherein the processor is further configured to control a network interface to:

send the DMRS configuration information to the terminal device, wherein when the DMRS configuration information comprises at least two kinds of DMRS configuration, the numbers of bits which correspond to the at least two kinds of DMRS configuration and are required for indicating DMRS port information are the same.

* * * * *